Feb. 10, 1970          G. V. WOODLING          3,494,624
FLUID SEAL FOR A SHAFT
Filed March 4, 1968
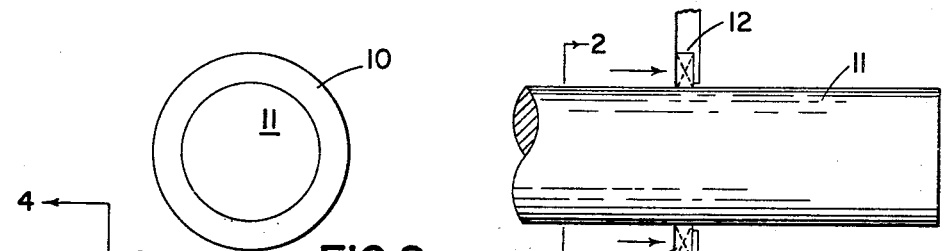
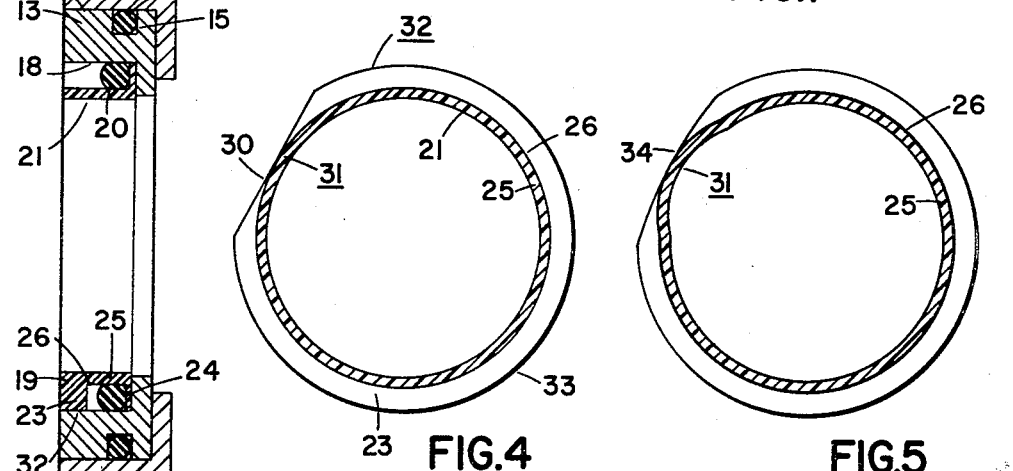
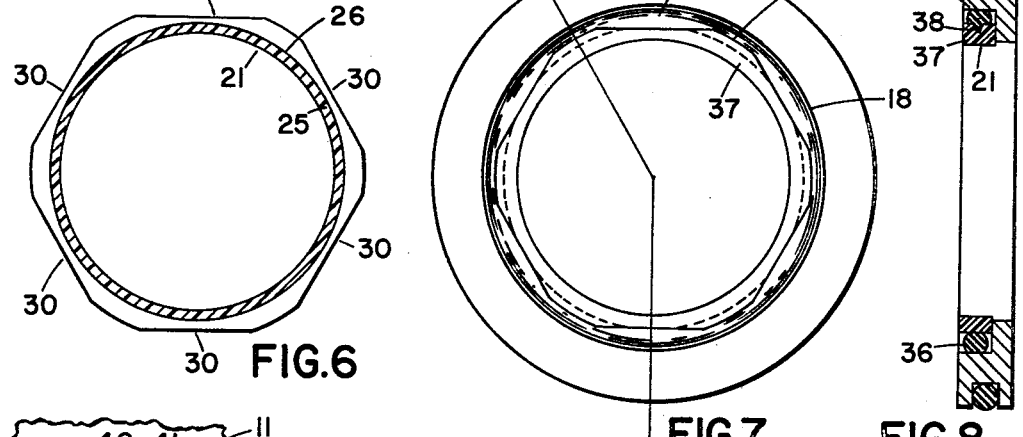
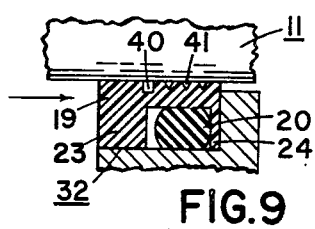
INVENTOR.
GEORGE V. WOODLING

United States Patent Office 3,494,624
Patented Feb. 10, 1970

3,494,624
FLUID SEAL FOR A SHAFT
George V. Woodling, 22077 W. Lake Road,
Rocky River, Ohio 44116
Filed Mar. 4, 1968, Ser. No. 710,052
Int. Cl. F16j *15/16, 15/54*
U.S. Cl. 277—26         8 Claims

ABSTRACT OF THE DISCLOSURE

Fluid seal means for a shaft extending through a body having substantially a cylindrical surface confronting and spaced outwardly from the shaft, wherein said seal means includes at least first and second annular members. The first annular member comprises a low friction, resistingly yieldable plastic material having an internal surface sealingly engaging the shaft. The second annular member comprises a yieldable rubber-like material sealingly disposed between the external surface of the first member and the substantially cylindrical surface. The first annular member includes a part thereof modulation portion means normally sealingly engaging said shaft and disposed to be constrained away from said shaft in response to heat.

---

My invention relates in general to shaft fluid seals and more particularly to rotating shaft seals.

Although my invention is particularly useful for rotating shaft seals, it is not necessarily limited thereto, because it may also be used on reciprocating shafts.

An object of my invention is the provision of a modulating shaft seal which provides for lubricating an otherwise dry shaft in modulated amounts to reduce the heat generated.

Another object of my invention is the provision of an annular sealing member having means responsive to generated heat to allow fluid to escape along the rotating shaft under the sealing member for lubricating an otherwise dry shaft and thereby reducing the amount of heat generated.

Another object of my invention is the provision of a modulating shaft seal having a modulated portion normally sealingly engaging the rotating shaft and disposed to be constrained away from the rotating shaft in response to generated heat to allow fluid to escape along the rotating shaft under the modulating portion and thereby reduce the amount of heat generated.

Another object of my invention is the provision of a shaft seal having prolonged life and having the ability to withstand higher fluid pressures and higher shaft speeds.

Another object of my invention is the provision of a shaft seal mounted in a metal retainer ring to provide a self-contained assembly.

Other objects and a fuller understanding of this invention may be had by referring to the following description and claims, taken in conjunction with the accompanying drawings, in which:

FIGURE 1 is a view, diagrammatically illustrating the position in which my shaft seal is mounted between a shaft and a cylindrical surface confronting and spaced outwardly from said shaft;

FIGURE 2 is an end view of FIGURE 1;

FIGURE 3 is an enlarged, (drawn two-time scale for a one inch shaft) diametrical cross-sectional view of a shaft seal embodying the features of my invention;

FIGURE 4 is a cross-sectional view taken along the line 4—4 of FIGURE 3 and shows only the plastic sealing ring and illustrating primarily a flat side extending in a chordal direction with respect to the cylindrical surface, the flat side defining with the internal surface, which sealingly engages the shaft, a modulating portion disposed to be constrained away (bulged out) from the shaft to allow fluid to seep between the shaft and the seal to lubricate same;

FIGURE 5 is a view similar to FIGURE 4, and shows the modulating portion of the plastic sealing ring constrained (bulged out) away from the shaft to allow fluid to seep between the shaft and the seal to lubricate same;

FIGURE 6 is a view similar to FIGURE 4, but shows six flat sides (polygon) instead of one;

FIGURE 7 is a modification of the invention and shows an O-ring disposed between the polygon and the cylindrical surface confronting and spaced outwardly from the shaft;

FIGURE 8 is a cross-section of the polygon of FIGURE 7, showing the rounded corner provided with a groove into which the O-ring resides; and FIGURE 9 is an enlarged, fragmentary cross-sectional view of the plastic sealing member and shows the internal surface of the sealing member provided with internal grooves.

In FIGURES 1 and 2, my shaft seal (diagrammatically illustrated) is identified by the reference character 10, and is disposed to be mounted between a shaft 11 and a counter-bore 12 provided in a flange or wall of a fluid pressure device through which the shaft extends. The shaft seal is responsive to fluid, under pressure in the fluid pressure device, and the direction at which the pressure is applied against the shaft seal is indicated by the arrows in FIGURE 1.

As shown in FIGURE 3, my shaft seal, in order to provide a self-contained assembly, may be mounted in a retainer ring 13 which is sealingly mounted in the counter-bore 12 by an O-ring 14 of rubber-like material fitting into an external groove 15. As illustrated, the retainer ring 13 has an internal cylindrical surface 18 confronting and spaced outwardly from the shaft 11. My shaft seal is disposed to be directly mounted between the cylindrical surface 18 and the shaft 11 and comprises first and second continuous, annular members surrounding the shaft 11. The first annular member is identified by the reference character 19 and comprises a low-friction plastic ring, preferably, made of "Teflon," "nylon," "Delrin," "Lexan," "Kel-F," and the like. These substances are obtainable under the trade-names mentioned and have varying formulas in accordance with the intended use. The second annular member is identified by the reference character 20 and comprises an O-ring 20 made of rubber-like material, such as "Neoprene" or the like and is commercially available in various formulations.

The low-friction plastic ring 19 has an internal surface 21, sealingly engaging the shaft, and an external surface, which in combination with the internal surface 21, defines substantially a U-shaped member. As shown, the U-shaped member comprises first and second annular flanges 23 and 24 axially spaced apart from each other. Between the flanges 23 and 24, is a circular body 25 integrally joining the two flanges together. The external surface of the circular body 25 constitutes an annular surface band and is identified by the reference character 26. The O-ring 20 is mounted between the annular surface band 26 of the circular body 25 and the internal cylindrical surface 18 of the retainer ring 13 and seals fluid pressure between the U-shaped member and the retainer ring 13. The flange 24, which engages a side of the O-ring 20, is disposed to hold the plastic sealing member 19 from freely sliding out of the retainer ring 13 during handling and shipping. However, after the shaft seal is mounted in the fluid pressure device, the fluid pressure acts to hold the plastic sealing member 19 in the retainer ring 13.

The flange 23 has a flat side 30 extending in a chordal direction with respect to the cylindrical surface 18. The side 30, need not necessarily be flat but may comprise any other suitable contour to achieve the intended purpose. The side 30, defines with the internal surface 21, which sealingly engages the shaft, a modulating portion 31 which is responsive to heat and allows fluid to escape under the seal to lubricate the shaft.

The flange 23 has an external surface confronting the cylindrical surface 18 and may be referred to as an annular surface band 32. Due to the side 30, the annular surface band 32 comprises an incomplete cylindrical surface 33, plus the side 30. Thus the annular surface band 32 has first surface area means (incomplete cylindrical surface 33) and second surface area means (side 30) disposed annularly relative to each other. The incomplete cylindrical surface 33 fits within the cylindrical surface 18 and defines a close dimensional tolerance therewith when the temperature of the U-shaped member is at a safe operating temperature level. The side 30, however, defines a wide dimensional tolerance or clearance with the cylindrical surface 18, whereby it is free to move (bulge out) outwardly toward the cylindrical surface 18. The side 30 also defines with the internal surface 21 the modulating portion 31 which sealing engages the shaft when the temperature of the U-shaped member is at a safe operating level.

In operation, the U-shaped member is responsive to heat generated by the rotating shaft and expands when the temperature thereof exceeds the safe operating level. The expansion soon forces the incomplete cylindrical surface 33 against the cylindrical surface 18, because the dimentional tolerances therebetween are close. The expanded material now has no place to go since it is contacting both the shaft and the cylindrical surface 18, and as a result the incomplete cylindrical body encompassed by the incomplete cylindrical surface 33 will be forced to elongate circumferentially. Consequently, the circumferential expansion will constrain the modulating portion 31, to bulge away from the shaft and allow fluid to seep between the shaft and the internal surface of the modulating portion 31, see FIGURE 5 where the bulge is indicated by the reference character 34 which, of course, is exaggerated because of limitations in mechanical draftsmanship. The amount of the bulge is very small, in the neighborhood of approximately .001 of an inch, more or less, but is sufficient to allow a thin film or fluid to seep along the shaft under the seal to lubricate the shaft. The lubrication of the shaft will cause the generated heat to subside and when the temperature of the U-shaped member sinks to a safe operating level, the bulge will shrink and constrainingly re-establish itself in sealing engagement with the shaft and blank the further seepage of fluid under the seal. This completes the modulating cycle which is self-perpetuating to keep the generated heat at a safe operating level. The modulated lubrication not only prolongs the life of the fluid seal, but also enables the fluid seal to withstand higher fluid pressures and higher shaft speeds.

FIGURE 6 is a modification of the invention, in that the flange 23 has six flat sides (polygon) instead of one. In this modification, there are six modulating portions instead of one, but the modulating action is the same as that described for one modulating portion. The corners of the polygon may be partially rounded, whereby the rounded corners make a close fit with the cylindrical surface 18. Thus, the diameter of the rounded corners of the polygon in FIGURE 6 is the same as the diameter of the incomplete cylindrical surface 33 of FIGURE 4.

FIGURES 7 and 8 show a further modification, in that an O-ring 36 is disposed between the rounded corners of a plastic sealing member 37 (polygon) and the cylindrical surface 18. The polygon 37 in FIGURE 7 has a cross-sectional area as shown in FIGURE 8. The plastic sealing ring 37 is thinner than the plastic sealing member 19 of FIGURE 3, since the O-ring 36 is mounted on top of the sealing member 37. The O-ring 36 is tightly squeezed at the rounded corners and moderately squeezed at the flat sides, see FIGURE 8. The expansion of the plastic sealing member 37 (polygon) in response to heat is opposed by the high pressure of the O-ring 37 at the rounded corners, thereby causing the modulating portions between the rounded corners to bulge outwardly and allow fluid to seep along the shaft under the seal. The modulating action in FIGURES 7 and 8 is the same as that described in the previous views, except that the modulating action is softened by the compression of the O-ring 36 at the rounded corners. In FIGURES 7 and 8, the rounded corners of the polygon 37 may be grooved at 38 to aid in keeping the O-ring 36 securely in place.

In FIGURE 9, the internal surface of the plastic sealing member 19 is provided with a continuous annular groove 40 disposed to collect the escaping fluid. The other illustrated groove 41 is helical and allows the lubricant collected in the annular groove 40 to helically escape along the shaft to lubricate same.

The shaft seals in FIGURES 3 and 8, being mounted in a metal retainer, are self-contained units, and may be easily mounted in the counter-bore 12. A small annular clearance, in the neighborhood of approximately .002 of an inch, more or less, may be provided between the outside surface of the retainer ring and the counter-bore 12, with the O-ring 14 functioning as a seal and a cushioning element, whereby the shaft seal assembly accommodates for axial eccentricity in case there is any mismatching, due to machining, between the axis of the shaft and the axis of the retainer ring.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. Fluid seal means for a shaft, said shaft extending through a body having substantially a cylindrical surface confronting and spaced outwardly from said shaft, said seal means comprising annular seal means sealingly disposed between said substantially a cylindrical surface and said shaft, said annular seal means and said shaft sealingly engaging each other and generating heat upon relative movement therebetween, said annular seal means comprises at least first and second annular members, said first annular member comprising a low-friction, resistingly yieldable plastic material having an internal surface sealingly engaging said shaft and having an external surface confronting said substantially a cylindrical surface, said second annular member comprising a yieldable rubber-like material and being sealingly disposed between said external surface of said first member and said substantially a cylindrical surface, said annular seal means including as part thereof modulating portion means normally sealingly engaging said shaft and disposed to be constrained away from said shaft in response to said heat.

2. The structure of claim 1, wherein said surface area means defines at least a side extending in substantially a chordal direction with respect to said substantially a cylindrical surface.

3. The structure of claim 1, wherein said surface area means defines a plurality of sides respectively extending in a chordal direction with respect to said substantially a cylindrical surface.

4. The structure of claim 3, wherein said plurality of sides define substantially a polygon.

5. The structure of claim 1, wherein said low-friction plastic material includes "Teflon," "nylon," "Delrin," "Lexan" and "Kel-F."

6. Fluid seal means for a shaft, said shaft extending through a body having substantially a cylindrical surface confronting and spaced outwardly from said shaft, said seal means comprising annular seal means sealingly disposed between said substantially a cylindrical surface and said shaft, said annular seal means and said shaft sealingly engaging each other and generating heat upon relative movement therebetween, said annular seal means comprises at least first and second annular members, said first annular member having an internal surface sealingly engaging said shaft and having an external surface confronting said substantially a cylindrical surface, said external surface having first and second annular surface bands axially disposed with respect to each other, said second annular member being sealingly disposed between said second annular surface band and said substantially a cylindrical surface, said first annular surface band including first and second surface area means disposed annularly relative to each other, said first surface area means fitting within said substantially a cylindrical surface and defining a close dimensional tolerance therewith when the temperature of said first annular member is at a safe operating level, said second surface area means confronting said substantially a cylindrical surface and defining a wide dimensional tolerance therewith, whereby said second surface area means is free to bulge outwardly toward said substantially a cylindrical surface, said second surface area means also defining with said internal surface modulating portion means sealingly engaging said shaft when the temperature of said first annular member is at a safe operating level, said first annular member being responsive to heat and expanding when the temperature thereof exceeds said safe operating level and thereby forcing said first surface area means against said substantially a cylindrical surface whereupon said modulating portion means is constrained to bulge away from said shaft to allow fluid to seep between said shaft and said internal surface of said first annular member to lubricate said shaft and reduce the amount of heat generated.

7. The structure of claim 6, wherein said first annular member comprises a low-friction plastic material and said second annular member comprises an O-ring of rubber-like material.

8. The structure of claim 7, wherein said low-friction plastic material includes "Teflon," "nylon," "Delrin," "Lexan" and "Kel-F."

References Cited
UNITED STATES PATENTS

| | | | |
|---|---|---|---|
| 2,253,904 | 8/1941 | Haug | 277—26 |
| 2,926,938 | 1/1960 | Ratti | 277—152 X |
| 3,214,179 | 10/1965 | Dega | 277—153 X |
| 3,268,235 | 8/1966 | Jacobellis | 277—165 |
| 3,331,609 | 7/1967 | Moran | 277—165 X |

SAMUEL ROTHBERG, Primary Examiner

U.S. Cl. X.R.

277—152, 165